No. 847,026. PATENTED MAR. 12, 1907.
M. O. SANDBERG.
MOTOR DRIVEN FARM IMPLEMENT.
APPLICATION FILED SEPT. 13, 1906.

3 SHEETS—SHEET 1.

Witnesses
C. K. Reubenbach.
ty. E. Chau....

Inventor
M. O. Sandberg.
By Chandler & Chandler
Attorneys

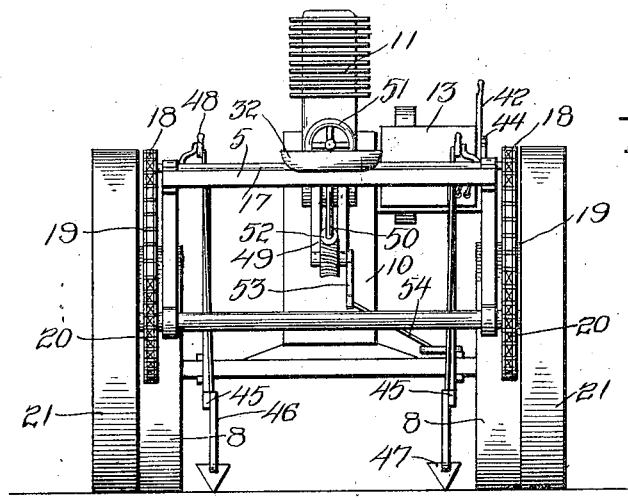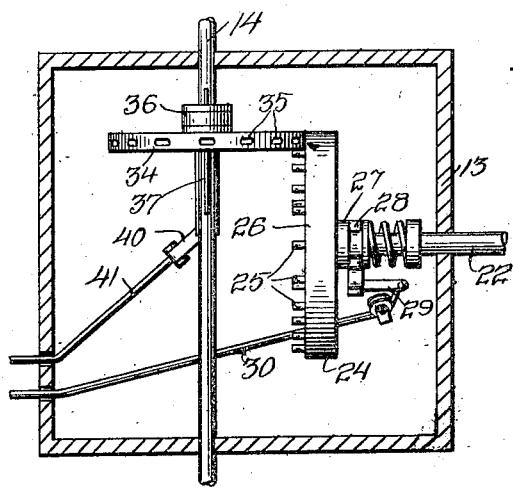

No. 847,026. PATENTED MAR. 12, 1907.
M. O. SANDBERG.
MOTOR DRIVEN FARM IMPLEMENT.
APPLICATION FILED SEPT. 13, 1906.
3 SHEETS—SHEET 3.
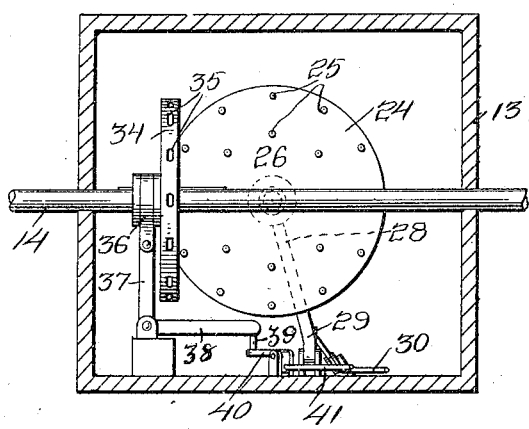
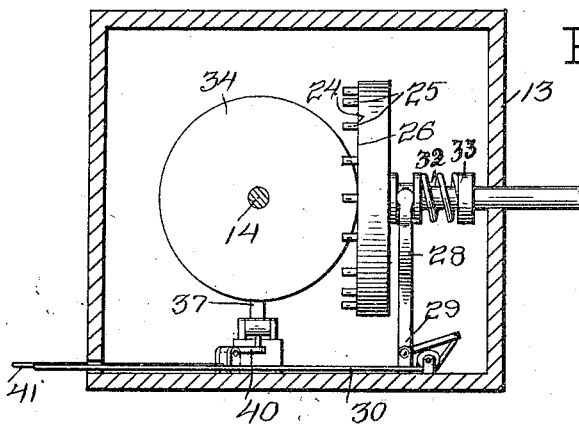

UNITED STATES PATENT OFFICE.

MELVIN O. SANDBERG, OF GRANITE FALLS, MINNESOTA.

MOTOR-DRIVEN FARM IMPLEMENT.

No. 847,026.  Specification of Letters Patent.  Patented March 12, 1907.

Application filed September 13, 1906. Serial No. 334,518.

*To all whom it may concern:*

Be it known that I, MELVIN O. SANDBERG, a citizen of the United States, residing at Granite Falls, in the county of Chippewa, State of Minnesota, have invented certain new and useful Improvements in Motor-Driven Farm Implements; and I do hereby declare the following to be a full, clear, and exact description of the invention, such as will enable others skilled in the art to which it appertains to make and use the same.

This invention relates to cultivators, and more particularly to self-propelled cultivators, and has for its object to provide a cultivator including a driving-motor and embodying a novel arrangement of parts.

Another object is to provide a cultivator including means for varying the power of the motor to suit soils of different consistencies.

Other objects and advantages will be apparent from the following description, and it is to be understood that I do not desire to be limited to the exact details of construction shown and described, for obvious modifications will occur to a person skilled in the art.

Figure 1:
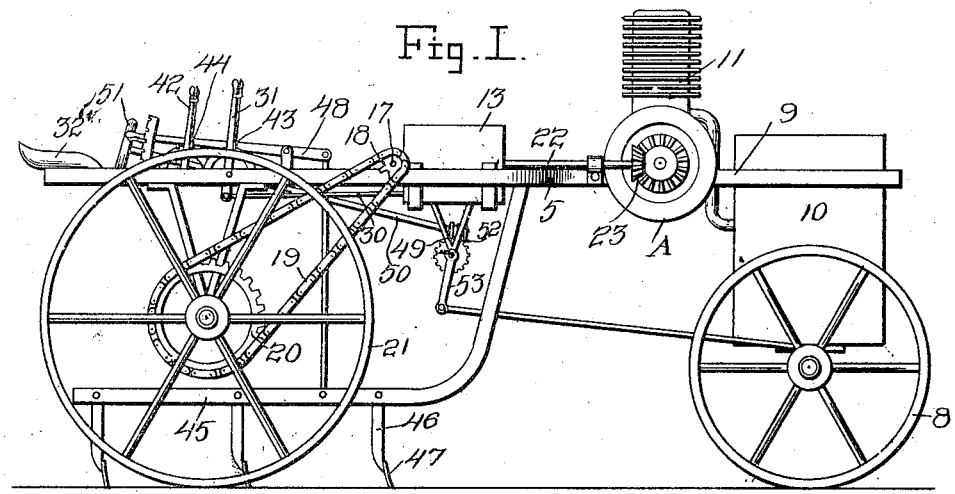
Figure 2:
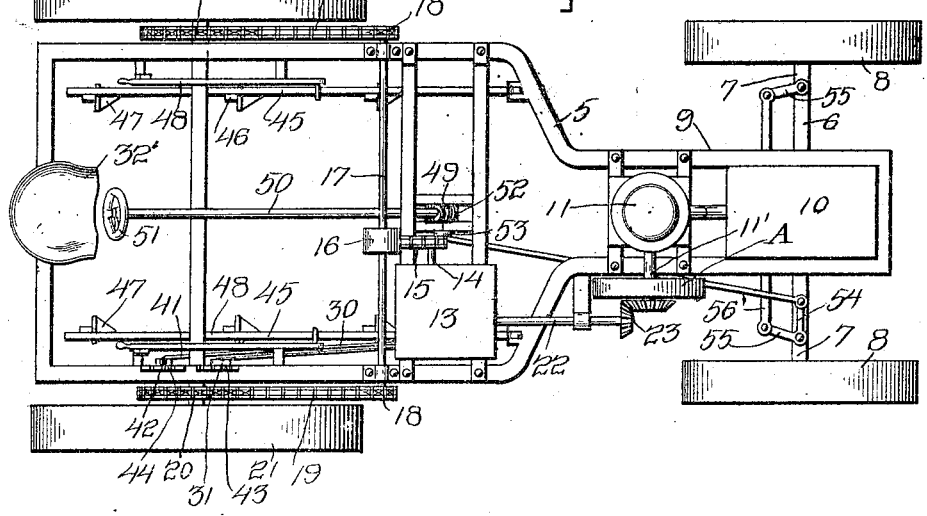

In the drawings forming a portion of this specification, and in which like numerals of reference indicate similar parts in the several views, Figure 1 is a side elevation of the present invention. Fig. 2 is a top plan view. Fig. 3 is a rear elevation. Fig. 4 is a horizontal section through the power-changing gear and the shafts. Fig. 5 is an elevational view of the power-changing gear, showing the lever mechanism. Fig. 6 is a longitudinal section.

Referring now to the drawings, the present invention comprises a frame 5, having a transverse stationary axle 6 at its forward end provided with steering-knuckles 7 at its ends, which carry the front wheels 8. The forward portion of the frame is transversely reduced, as shown at 9, and has mounted therein a gasolene-tank 10, and rearwardly of the gasolene-tank there is mounted transversely a vertical motor 11 of the two-cycle type.

Rearwardly of the engine there is mounted a gear-box 13, and extending out of the gear-box there is a shaft 14, connected, by means of a chain 15, with the differential 16 of a counter-shaft 17, the latter having sprockets 18 at its ends connected, by means of chains 19, with sprockets 20, carried by the rear wheel 21 of the implement.

Within the gear-box there is journaled a longitudinally-extending shaft 22, connected, by means of bevel-gear 23, with the shaft of the motor 11, and within the box this shaft has splined thereupon for movement longitudinally thereof a disk 24, having a plurality of concentric series of pins 25, projecting outwardly from its inner face 26. A grooved collar 27 is carried by the disk and has engaged therein a yoke 28, carried by an angle-lever 29, which is connected, by means of a cable 30, with a hand-lever 31, located within reach of a seat 32', mounted at the rearward end of the frame 5, and the arrangement is such that operation of the hand-lever in one direction moves the disk 24 forwardly upon the shaft 22, and a spring 32 is arranged between the collar 27 and a fixed collar 33 upon the shaft 22 to hold the disk yieldably against forward movement.

The portion of the shaft 14 which passes through the gear-box has splined thereupon a disk 34, which is thus movable longitudinally of the shaft 14 and which extends at right angles to the disk 24, and this disk 34 lies with the disk 24 normally against its periphery and has in its periphery a series of sockets 35 for the reception of the pins 25 of the different series. Shifting mechanism is provided for the disk 34, consisting of a yoke 36 and an angle 37, pivoted to the yoke for movement of the disk longitudinally of the shaft 14 when the angle-lever is moved, and the shifting mechanism also includes a link 39, which is engaged in the horizontal arm 38 of the lever 37 and which is pivoted to a second angle-lever 40 for vertical movement of the arm 38 when the angle-lever 40 is moved, and the latter is connected, by means of a rod 41, with a hand-lever 42 for movement thereof. Both hand-levers are located within reach of the seat 32'. It will thus be seen that when the power of the engine is to be increased it is but necessary to operate the hand-lever 31 to bring the disk 24 out of engagement with the disk 34, which disengages the pins from the sockets 35, and the disk 34 may then be moved, through the medium of the hand-lever 42 and connections, into position to receive the innermost series of pins 25 in its sockets, when the hand-lever 31 may be released to allow the spring 32 to return the disk 24 to normal position. A rack-and-dog mechanism 43 is provided to hold the lever 31, with the disk 24, in inoperative position, and a similar mechanism 44 is provided for the hand-lever 42 and is arranged to hold the disk 34 at different points of its movement and in position to receive the several series of pins in its sockets.

Cultivator-arms 45 are pivoted to the frame 5 for vertical movement and have depending stocks 46, which carry ground-treating devices 47, and levers 48 are provided for movement of the frame 45 into and out of operative position and may be reached from the seat 32'.

A steering-gear 49 includes a shaft 50, having a wheel 51 within reach of the seat 32', and includes also a worm-gear 52 and rods 53, connected with a shaft which carries the worm and with a finger 54, extending inwardly from one of the steering-knuckles 7, the two steering-knuckles having their fingers 55 connected by a rod 56'.

The shaft of the motor 11 extends laterally beyond the frame, as shown at 11', and carries a belt-wheel A, which may be used in driving other machinery.

What is claimed is—

1. In a machine of the class described, the combination with a frame, of a motor in the frame, steering-wheels at the forward end of the frame, steering mechanism connected with the wheels, a gear-box in the frame, power-varying gear within the box, said gear including a shaft extending outwardly of the box, transversely of the machine, connections between the motor and gear, a counter-shaft journaled transversely of the machine, a differential gear for the counter-shaft, connections between the first-named shaft and the counter-shaft, drive-wheels for the frame, sprockets carried by the drive-wheels, sprockets carried by the counter-shaft, chain connection between the sprockets of the drive-wheels and counter-shaft, a seat at the rearward end of the frame, and a steering-wheel connected with the steering mechanism and lying within reach of the seat.

2. In a machine of the class described, the combination with a frame, of a motor mounted in the frame, a shaft connected with the motor for rotation thereby, a disk splined upon the shaft, a second shaft, a disk splined upon the second shaft and extending at right angles to the first-named disk and lying in position to receive the first-named disk against its periphery, a spring arranged to hold the first-named disk yieldably in engagement with the second-named disk, concentric circular series of pins carried by the first-named disk, said second-named disk having peripheral sockets for the reception of the pins and being movable to receive the pins of the different series in its sockets interchangeably, means for moving the first-named disk against the action of the spring, means for moving the second-named disk transversely of the first-named disk, drive-wheels for the frame, and connections between the second shaft and the drive-wheels for operation thereof.

3. In a machine of the class described, the combination with a frame, of a motor mounted in the frame, a shaft connected with the motor for operation thereby, a disk splined upon the shaft, a second disk extending at right angles to the first-named disk and lying in position to receive the first-named disk against its periphery when the first-named disk is at one limit of its movement, a shaft extending at right angles to the first-named shaft and upon which the second-named disk is splined, a collar on the first-named shaft on the opposite side of the first-named disk from the second-named disk, a spring arranged between the first-named disk and collar, to hold the first-named disk against the second-named disk, an angle lever connected with the first-named disk for movement thereof against the action of the spring, means for moving the angle-lever, means for holding the moving means with the first-named disk out of engagement with the second-named disk, a plurality of concentric circular series of pins carried by the first-named disk at its side adjacent to the second-named disk, said second-named disk having pin-receiving sockets in its periphery and being movable to receive the pins of the different series interchangeably, a grooved collar carried by the second-named disk, a yoke engaged in the groove of the collar, an angle-lever pivoted to the yoke, a third angle-lever, connections between the second and third angle-levers for simultaneous movement thereof, a pivoted hand-lever, a rod pivoted to the hand-lever and to the third angle-lever for simultaneous movement thereof, and means for holding the hand-lever with the disk in position to receive pins of the different series.

In testimony whereof I affix my signature in presence of two witnesses.

MELVIN O. SANDBERG.

Witnesses:
  H. P. HAUGEN,
  B. M. SANDBERG.